(No Model.) 4 Sheets—Sheet 1.

O. H. JEWELL.
STRAINER FOR FILTERS.

No. 572,605. Patented Dec. 8, 1896.

Witnesses
Inventor
Omar H. Jewell.
By his Attorneys (No Model.) 4 Sheets—Sheet 2.

O. H. JEWELL.
STRAINER FOR FILTERS.

No. 572,605. Patented Dec. 8, 1896.

Witnesses
Inventor
Omar H. Jewell
By his Attorneys (No Model.) 4 Sheets—Sheet 3.
O. H. JEWELL.
STRAINER FOR FILTERS.

No. 572,605. Patented Dec. 8, 1896.

Witnesses Inventor (No Model.) 4 Sheets—Sheet 4.
O. H. JEWELL.
STRAINER FOR FILTERS.

No. 572,605. Patented Dec. 8, 1896.

UNITED STATES PATENT OFFICE.

OMAR H. JEWELL, OF CHICAGO, ILLINOIS, ASSIGNOR TO THE O. H. JEWELL FILTER COMPANY, OF SAME PLACE.

STRAINER FOR FILTERS.

SPECIFICATION forming part of Letters Patent No. 572,605, dated December 8, 1896.

Application filed February 26, 1896. Serial No. 580,830. (No model.)

*To all whom it may concern:*

Be it known that I, OMAR H. JEWELL, a citizen of the United States, residing in Chicago, in the county of Cook and State of Illinois, have invented certain new and useful Improvements in Strainers for Filters, of which the following is a specification, reference being had to the accompanying drawings, in which—

Figure 1:
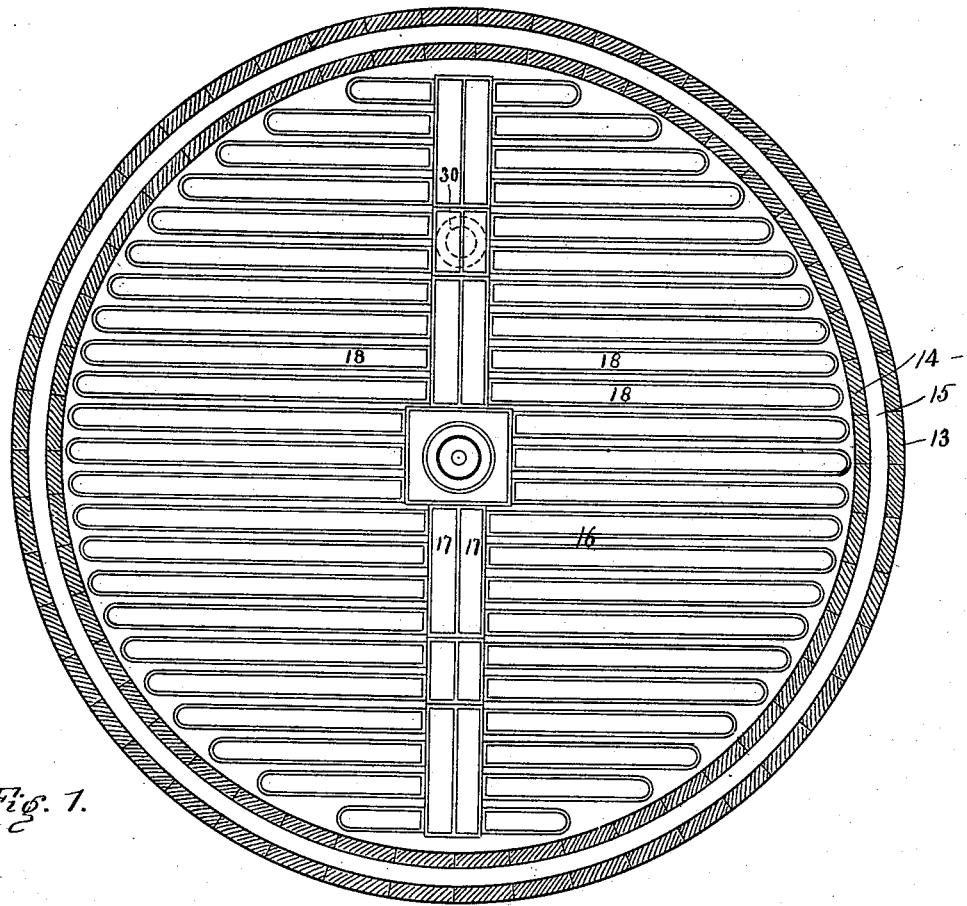
Figure 2:
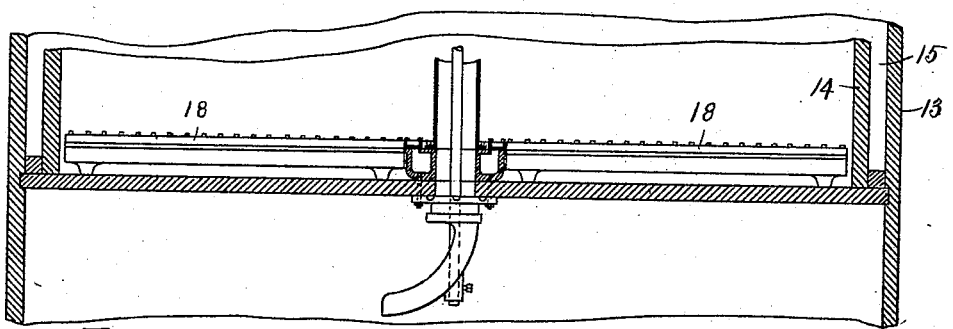
Figure 3:
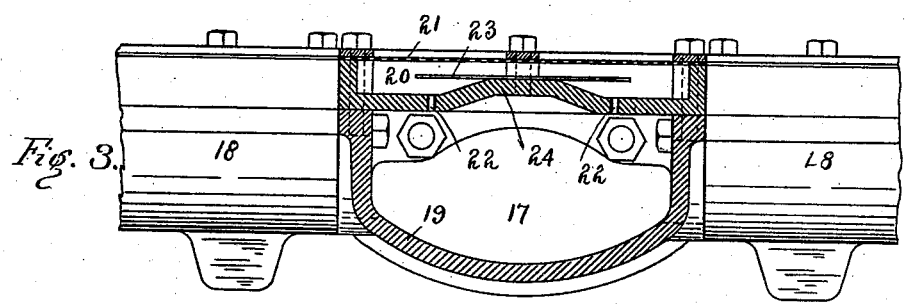
Figure 4:
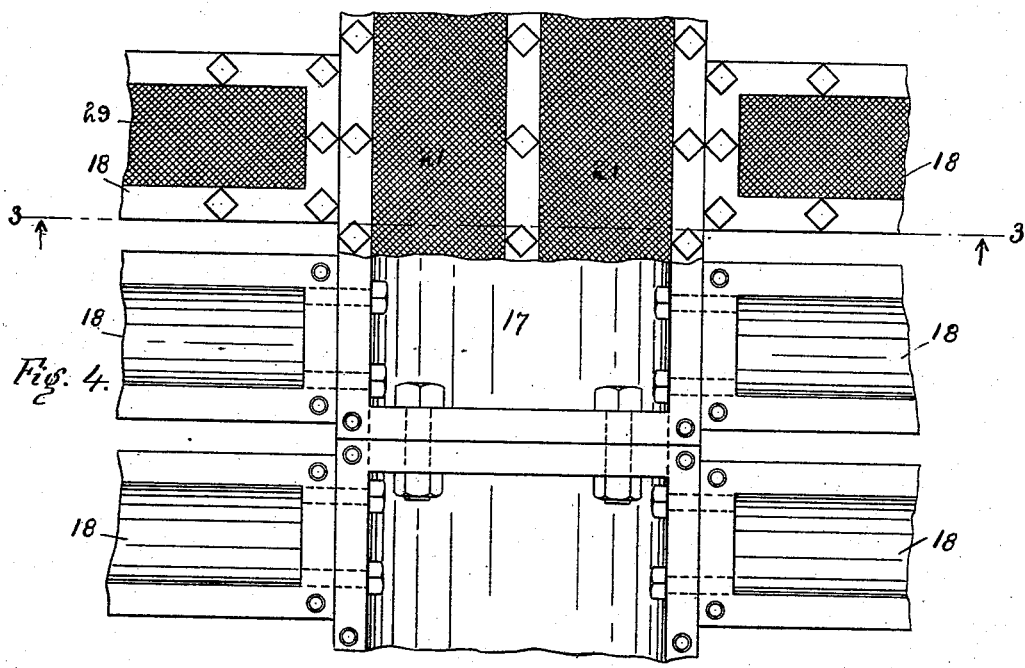
Figure 5:
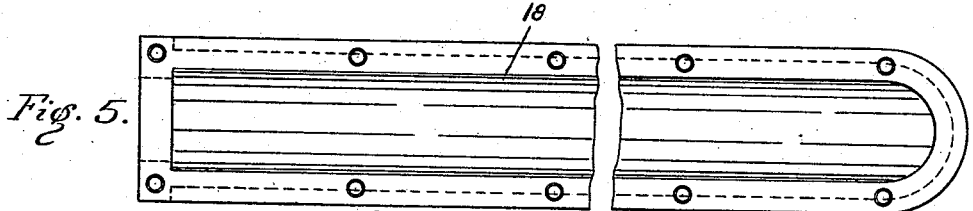
Figure 6:
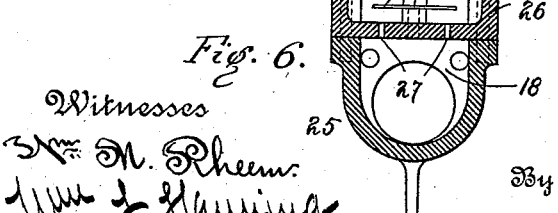
Figure 7:
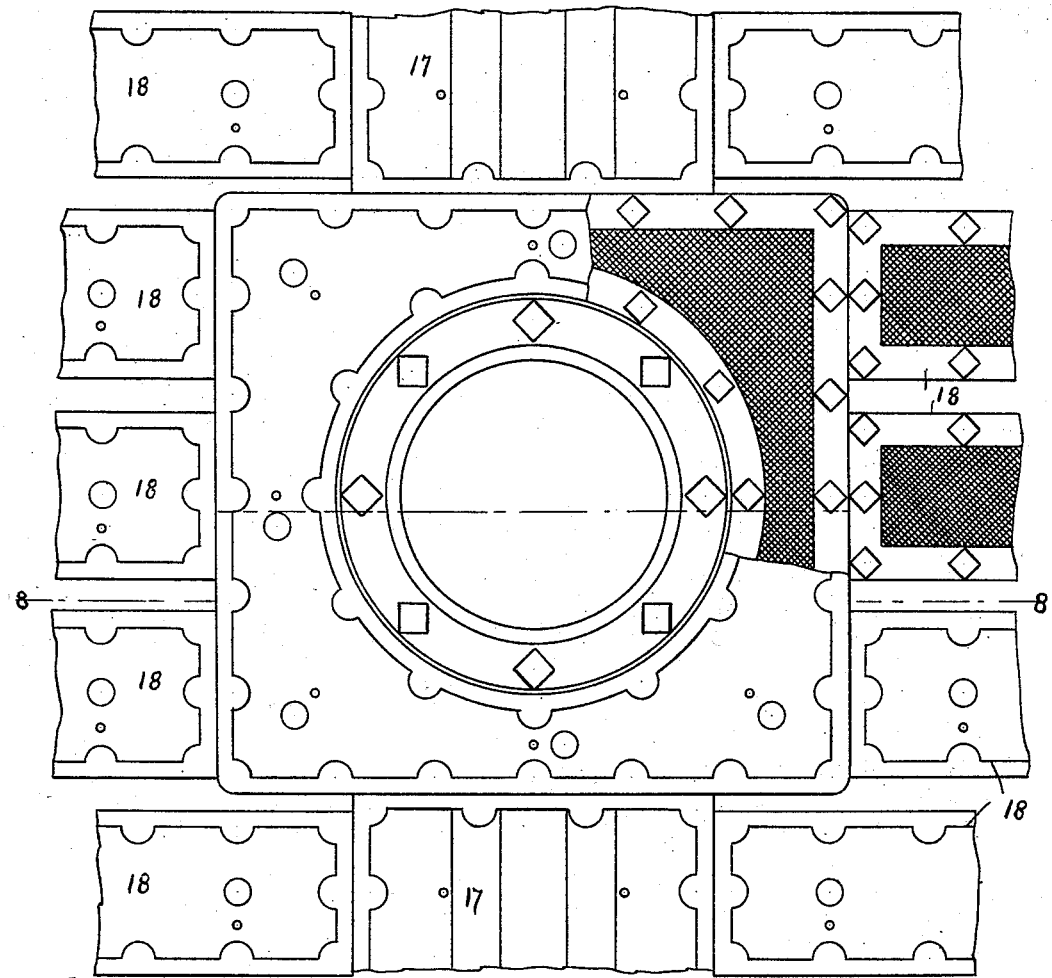
Figure 8:
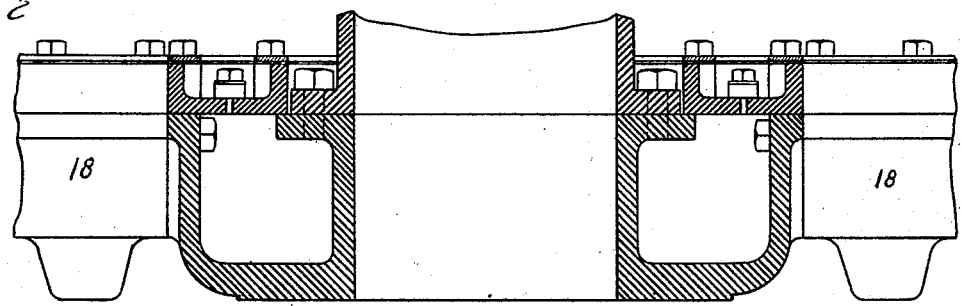
Figure 9:
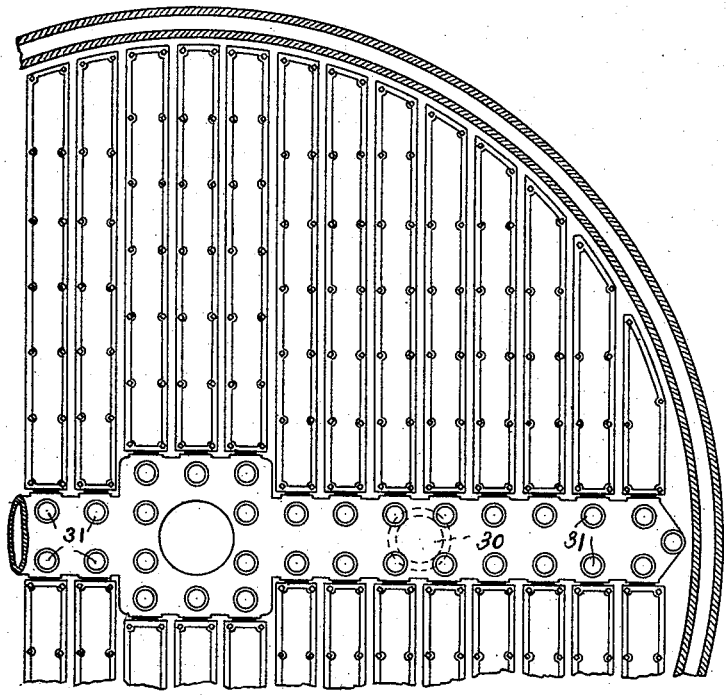
Figure 10:
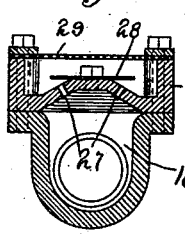
Figure 11:
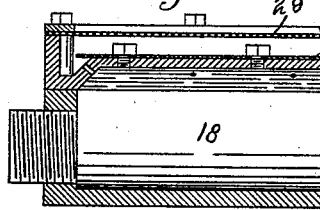
Figure 12:
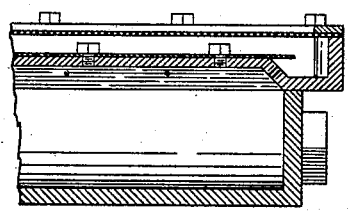
Figure 12:
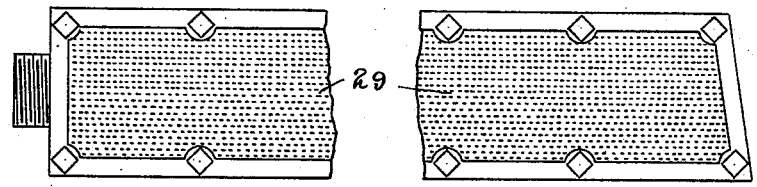

Figure 1 is a cross-section of the filter, showing the system of strainers in the bottom thereof. Fig. 2 is a vertical cross-section of the bottom of the filter. Fig. 3 is a vertical cross-section on line 3 3 of Fig. 4. Fig. 4 is an enlarged detail, being a partial plan view of the parts shown in Fig. 3. Fig. 5 is a plan view of one of the branch pipes. Fig. 6 is a cross-section thereof. Fig. 7 is an enlarged detail, being a plan view of a part of the system of strainers, part of the covering being removed. Fig. 8 is a cross-section on line 8 8 of Fig. 7. Fig. 9 is a partial plan view showing a modification. Fig. 10 is a cross-section of one of the branch pipes. Fig. 11 is a longitudinal section of the same. Fig. 12 is a plan view of the same.

My invention relates to strainers for filters, and particularly to strainers for that class of filters commonly used for filtering large quantities of water which make use of a granular filter-bed, through which the water is strained or filtered. Filters of this class as usually constructed comprise a filter-tank of suitable dimensions either having a perforated bottom or being provided with a series of strainers which will serve to prevent the granular filter-bed which is placed in the tank from being carried off through the delivery-pipes, while permitting the filtered water to be carried off. In filtering water in this way the filter-bed accumulates a large quantity of impure matter, and in order that the water may be properly filtered it is necessary at more or less frequent intervals to wash out the granular filter-bed, and this is usually accomplished by directing a current of water through the filter-bed in an upward direction, thereby loosening up the filter-bed and carrying the impurities upward to the surface of the bed, whence they are carried off by a suitable waste-pipe. For supplying the reverse flow of water it has heretofore been common to utilize the system of pipes and strainers provided for carrying off the filtered water, suitable valves being provided whereby the water may be permitted to flow through such pipes in either direction.

While many filters have been constructed to operate as above described, the operation of washing has not been entirely satisfactory, owing to the fact that when the water is forced under the filter-bed for the purpose of washing it out it will rise at the points which offer the least resistance, thereby cutting channels through the filter-bed and washing out certain portions of it, leaving other portions undisturbed and unwashed, rendering it necessary to make use of agitating devices for the purpose of stirring up the filter-bed during the operation of washing. The use of agitating devices is, however, objectionable, as it is necessary when such devices are used to make the filter of comparatively small size, as the agitators cannot be successfully used in the larger sizes of filters. Furthermore, even with the use of agitators, when the wash-water is not properly distributed throughout the filter-bed the granular material is not thoroughly washed, as it is impossible in practice to extend the agitating devices to the bottom of the filter-bed, and consequently the impurities are not all removed.

The objections above pointed out have long been recognized by filter men, and many attempts have been made to avoid them, but so far as I am aware none of such attempts have been successful. I have discovered, however, that by so constructing the filter-screens that the wash-water will be equally distributed throughout the bottom of the filter under the filter-bed, the wash-water will rise uniformly through the bed, whereby the entire filter-bed will be held in suspension when water is forced up through it, thereby effectually loosening all the particles of granular material and permitting the impurities to be carried up to the surface by the water. A further advantage of my improvement is that by thus suspending the filter-bed in the water its consistency is so reduced that even in very large filters agitating devices may be successfully used when desired, so that the filtering material may be thoroughly washed out. This is illustrated by the fact that by actual practice I have found that by my improvement I am able to make use of a filter having a capacity of several million gallons per day and to operate the same as well as it has heretofore been possible to operate one having a capacity of one hundred thousand gallons per day.

For the purpose of further securing the effectual distribution of the wash-water throughout the several pipes and in that way furthering the work of equally distributing the wash-water throughout the filter-bed I provide a series of orifices through which the water is discharged into the filter-bed, the combined area of which orifices is equal to the area of the supply-pipe. That is to say, describing the principle as applied to the strainer systems commonly used in filters, the outlet-orifices through which the water is discharged from the strainer-pipes to the filter have a combined area which is equal to the area of the pipe used to supply water for washing the bed. The water is thereby compelled to be discharged equally through all the outlets in washing, with the result above described. This construction is also advantageous in filtering, as the water is caused to percolate straight down through the filter-bed without forming lateral currents, which would tend to form channels through the filter-bed through which the water might pass without proper filtration.

I will now describe specifically my improvement as applied to a filter.

In the accompanying drawings, 13 indicates the filter-tank, in the lower portion whereof is an inner wall 14, forming an annular trough 15, as best shown in Figs. 1 and 2.

16 indicates a system of strainers, 17 being a central manifold, to which is connected a series of branch pipes 18, covering the bottom of the filter-bed, as shown in Fig. 1. As best shown in Fig. 3, this central manifold consists of a lower part 19, which is U-shaped, and an upper part 20, secured upon the lower part, said upper part being also somewhat U-shaped and having upon its upper surface a screen 21. In the bottom of the upper part 20 of the manifold is a series of orifices 22, through which the water passes into the manifold in filtering and upward out of the manifold in washing the filter-bed.

23 indicates a deflecting-plate secured upon a portion 24 of the bottom of the part 20, which extends upward, as shown in Fig. 3. The deflecting-plate 23 serves to deflect the water as it rises through the orifices 22 and causes it to extend uniformly under the screen 21, through which it rises in washing the filter.

The branch pipes 18 are constructed similarly to the manifold 17, being provided with a U-shaped lower portion 25 and a similarly-shaped upper portion 26, having orifices 27 for the passage of the water, a deflector 28 to deflect the water, and a screen 29 to prevent the granular matter comprising the filter-bed from entering the pipe.

As heretofore described, the combined area of the orifices 22 27 is equal to the area of the inlet-pipe, through which the water enters for washing out the filter-bed, and which is indicated in dotted lines at 30 in Figs. 1 and 9.

In Fig. 1 I have shown the manifold 17 as being provided with screen-plates, but instead of this construction a series of disk screens 31 may be used, as shown in Fig. 9, and instead of making the upper portion of the branch pipes with a flat bottom, as shown in Fig. 6, such part may be made inclined, as shown in Figs. 10 and 11. It will be understood, further, that other modifications may be made without departing from the spirit of my invention, as I do not wish to be limited to the specific details shown.

That which I claim as my invention, and desire to secure by Letters Patent, is—

A strainer-pipe for filters consisting of two U-shaped portions connected together, the upper portion having one or more water-orifices, a strainer carried by said upper portion, and a deflector between said strainer and said orifice or orifices, substantially as described.

OMAR H. JEWELL.

Witnesses:
JOHN L. JACKSON,
ALBERT H. ADAMS.